United States Patent Office 3,411,993
Patented Nov. 19, 1968

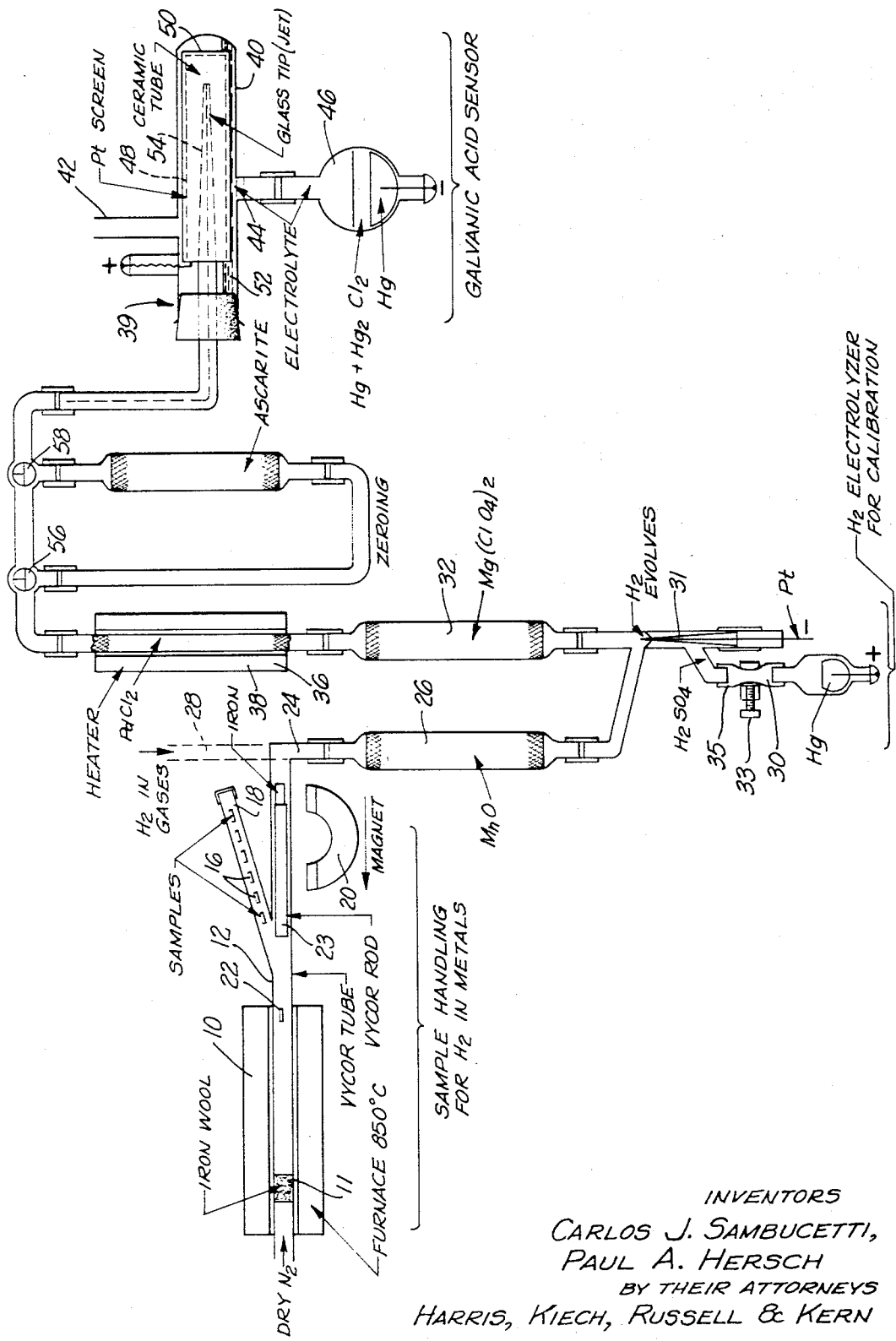

3,411,993
HYDROGEN DETECTION
Carlos J. Sambucetti, La Habra, and Paul A. Hersch, Fullerton, Calif., assignors to Beckman Instruments, Inc., a corporation of California
Filed Feb. 8, 1965, Ser. No. 431,009
17 Claims. (Cl. 204—1)

ABSTRACT OF THE DISCLOSURE

A method and apparatus for quantitatively detecting hydrogen gas in a gas stream in which the hydrogen is quantitatively converted into an acid vapor by reaction with a metal halide. The acid vapor is conveyed to an analytical device which quantitatively and directly detects the acid vapor in the gas stream, thus provides a measure of the hydrogen in the initial gas stream. The invention may be employed for measuring hydrogen in a metallic specimen by heating the specimen and thus evolving the hydrogen gas which is conveyed by a carrier gas to the metal halide for reaction therewith.

---

This invention relates to the quantitative detection of hydrogen gas. More particularly, the invention provides apparatus and a process for the quantitative detection of hydrogen gas in a gas stream, which hydrogen may be derived from a metallic specimen. The invention uses an earlier developed process for the galvanic sensing of small quantities of acid. In the present invention, these are generated quantitatively from hydrogen gas initially present in a gas stream at a p.p.m. level.

The invention in one form provides a method and apparatus for the quantitative detection, continuous or batchwise, of hydrogen gas, which may be either present as a trace impurity in a gas stream or contained in a solid sample such as steel. In the latter case, the hydrogen gas is liberated by heating the sample in an inert carrier gas stream of nitrogen or other suitable gas and carried to an analysis system. In the analysis system the hydrogen is converted quantitatively to a halogen acid and thereafter passed to a galvanic sensor wherein there is generated a current equivalent to the amount of acid that enters the sensor.

The monitoring process for an acid-containing gas stream involves providing an electrolytic cell containing an unbuffered electrolyte having a water-soluble salt pair of a halate and a halide with a spaced anode and cathode located therein. The acid-containing gas stream being monitored is introduced into the cell, bringing acid vapor into contact with the unbuffered electrolyte to generate halogen which halogen is reduced to a halide at the cathode, thereby generating a current which is measured to determine the amount of acid admitted to the cell with the gas stream. This process is especially suitable for the continuous monitoring of traces of strong acid vapors in air and other gases and is capable of detecting acid present in very few parts per million. It is advantageous to keep the ionic strength of the electrolyte high, in the interest of a speedy and complete chemical reaction and this may be done by including a third salt to improve the ionic strength of the electrolyte. In the preferred cell of the invention, the halogen-derived salt pair employed is potassium iodate and potassium iodide with a substantial addition of potassium bromide. The salt pair bromide/bromate may also be employed. Sodium salts may be used instead of potassium salts. Mixed halogen-derived salt pairs such as an iodate and a bromide or a bromate and an iodide are also usable in the process.

The galvanic acid sensor cell or monitor used in the invention preferably employs a platinum cathode and activated carbon anode. However, the two electrodes may be formed of other materials; for example, the cathode may be formed of graphite and the anode of either silver or mercury.

According to the present invention hydrogen is converted quantitatively to a halogen acid preferably employing a method wherein an oxygen-free, moisture-free inert gas stream containing the hydrogen is provided to a metal halide reactor made of either palladium halide, nickel halide, or cerous halide. In the metal halide reactor, the hydrogen of the gas stream is quantitatively reacted with the metal halide at a suitable elevated temperature to produce the halogen acid. For checking purposes the hydrogen is supplied in a known amount, usually being generated electrolytically and injected into the gas stream flowing to the metal halide reactor. Normally, since it is desired to detect the hydrogen gas present as a trace impurity in a gas stream or contained in a solid sample such as a metallic specimen, and/or to determine quantitatively its amount, the quantity of hydrogen flowing to the metal halide reactor will not be known, but in the reactor the hydrogen gas is converted to a halogen acid and passed to the galvanic acid sensor which, being coulometric, needs no calibration and will give a current reading equivalent to the amount of acid that enters the sensing cell. Since the acid is produced quantitatively from the hydrogen entering the metal halide reactor, the current reading of the sensing cell is indicative of the quantity of hydrogen gas present in the stream flowing to the metal reactor.

The monitoring process of the invention for thus determining hydrogen in a gas stream does not require the application of an external electromotive force. The conversion of the acid into a halogen and the reduction of the halogen to a halide at the cathode to generate current are determined by stoichiometry and by Faraday's law, not by the geometry of the cell or by temperature. The acid galvanic sensor is coulometric and there is no need for calibration. In one preferred embodiment of the acid sensing method there is utilized a galvanic cell with a platinum cathode, an activated carbon anode, and an aqeous electrolyte of potassium iodate, potassium iodide and potassium bromide. Sodium bromide or sodium chloride may also be employed in the place of the potassium bromide for further ionic strength to insure that the cell will behave coulometrically. Sodium bromide is advantageous because of its high water solubility but other ionizing salts may be used including sodium nitrate whose incorporation in the electrolyte will also improve the cell behavior. The improvement obtained with sodium nitrate shows that the effect of the third salt does not depend on the nature of its anion or cation but on the over-all ionic strength. In the cell the acid liberates iodine in the instance of an iodide-iodate electrolyte according to the reaction:

(1) $\quad\quad 6H^+ + 5I^- + IO_3^- = 3I_2 + 3H_2O$

The iodine in turn is reduced at the cathode:

(2) $\quad\quad\quad\quad I_2 + 2e = 2I^-$ consuming electrons which are provided by the anodic process of oxidation of anodic material, for example in the case of a mercury anode, in accordance with the following equation:

(3) $\quad\quad\quad\quad 2Hg - 2e = Hg_2^{++}$

On the arrival of the acid vapor in the electro-chemical sensor, reactions (1), (2), and (3) occur virtually instantaneously. Thus, it is seen that upon the admission of acid into the cell, the iodine or other halogen generated according ot reaction (1) is reduced at the cathode, creating a galvanic current equivalent to the amount of acid that entered the electro-chemical acid sensor.

Various halate and halide salt pairs are available for use in the electrolyte of the acid galvanic sensor. The halate is desirably chosen from the group made up of an iodate and bromate and the halide from a group comprising an iodide and bromide. The available halate-halide pairs include a bromate and iodide; a bromate and bromide; an iodate and iodide; and an iodate and bromide. The iodate reacts very rapidly with the halide, preferably an iodide, in the presence of acids even in very weak acid solutions provided by a few p.p.m. of the acid in a gas. The bromate has a slower rate of reaction than the iodate but it is still significantly high, being especially suitable for the detection of higher concentrations of strong acids.

The electrolyte composition desirably is a three component system made up of a halate, a halide and a third salt. The latter salt should be present in a high enough concentration to provide for good ionic strength. It is possible to use a two component system for the electrolyte composition such as an iodate salt with sodium bromide with the latter being provided in a sufficiently high concentration to provide both for the necessary ionic strength and the source of free halogen upon the introduction of hydrogen ions to the acid galvanic sensor. Thus, if the halide of the halogen-derived salt prior is present in a sufficiently high concentration, a two component system in the electrolyte will suffice. For example, satisfactory results are obtained in some applications with the systems made up of (0.1 M $KIO_3$+2 M KI) or (0.1 M $KIO_3$+3 M NaBr). In the first example it is not advisable to employ a too high concentration of the iodide in the solution because such solutions tend to form free iodine through air oxidation giving a continuously increasing large background. For this reason the iodide concentration is desirably maintained at a minimum compatible with the requirement of the reaction with the acids. The use of iodides to provide for ionic strength is generally undesirable.

Even though systems such as

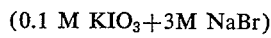
(0.1 M $KIO_3$+3M NaBr)

or (0.1 M $KIO_3$+M KBr) are suitable for most applications, it has been found that the addition of a trace of an iodide enhances the reaction rate and assures that the system will have a fast response and exhibit a quantitative yield. This accounts for the preferred three component system made up of

(0.05 M $KIO_3$+0.01 M KI+3 M NaBr).

The ranges of the quantities of halate and halide employed in the electrolyte are not narrowly critical and widely varying concentrations may be utilized. The ionic strength of the electrolyte should not be too low or otherwise this may result in an objectionably low response. The concentration of the various salts, of course, is limited by their solubilities in the electrolyte solution. Both the halate and halide ions must be present for generation of the halogen. The halate is slowly consumed over a period of use forming a halide and for this reason the electrolytic solution is eventually replenished.

In the preferred embodiment, the potassium iodate is used in an amount in the range of 0.01 to 0.25 mol/liter, the potassium iodide in an amount in the range of 0.002 to 0.05 mol/liter and the sodium bromide in an amount in the range of 1 to 5 mol/liter of electrolyte. An especially suitable combination employs three mols of sodium bromide, 0.05 mol of potassium iodate, and 0.01 mol of potassium iodide in a liter of the aqueous electrolyte. The use of the extra salt in the electrolytic solution, bromide in this preferred example, to improve the ionic strength, permits the employment of very low concentrations of the halate and halide salt.

The gas stream being monitored for hydrogen gas is delivered in a dry, oxygen-free state to a bed of a metal halide, preferably palladium chloride where the hydrogen is converted to hydrogen halide in accordance with the reaction:

(4)  $PdCl_2+H_2=Pd+2HCl$

The reaction is autocatalytic and as soon as the first nuclei of metallic palladium are formed they accelerate the reduction of further palladium chloride. The reaction is similar for other metallic halides including nickel halide. The metallic halides are preferably chlorides and bromides. Cerous chloride may also be used, in which case the solid reaction product is not metal but a lower-valent chloride of unknown stoichiometry. The presence of oxide impurities in the metallic halide and hence the presence of oxygen in the gas stream being monitored are to be strictly avoided in order to eliminate the side reaction:

(5) 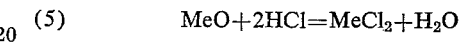 $MeO+2HCl=MeCl_2+H_2O$ where Me represents a metal such as palladium or nickel.

It is also important that no moisture be present in the gas stream flowing to the metal halide reactor and thoroughly dry conditions should prevail because the hydrogen halides such as hydrogen chloride are strongly adsorbed by glass ducts in the presence of moisture whereas with dry gas, the adsorption of acidic vapor is negligible. The heating of palladium chloride, nickel chloride, and cerous chloride to the hydrogen-reactive temperature will result in the quantitative release of hydrogen chloride. Palladium chloride is the preferred material as its reaction occurs at lower temperatures than with the other halides.

Before using the metal halide reactor, whether it be palladium chloride, nickel chloride, or other material, it is highly desirable that the reactor be operated at an elevated temperature in the presence of hydrogen for a period of time to assure elimination of all traces of humidity or other interfering impurities. In the instance of palladium chloride, the reactor is readied for operation by heating to a temperature of about 300° C. in the presence of some hydrogen, either from the sample, or generated electrolytically. Once at least the leading end of the reactor bed has reached its active state, the temperature in the reactor may be decreased to ambient temperature although one may prefer operating a palladium chloride reactor above 150° C. to avoid absorption of hydrogen by the metallic palladium. Such a pretreated palladium chloride reacts fast and quantitatively.

A nickel chloride reactor will also quantitatively convert hydrogen to hydrogen chloride. However, the required temperature of operation is considerably higher than for a palladium chloride reactor. A temperature of 600° C. is required for total conversion of hydrogen levels larger than 50 p.p.m. $H_2$. Lower hydrogen levels can be converted into HCl at about 500° C.

The apparatus of the illustrated system is principally formed of glass. At the left of the drawing there is illustrated a furnace 10 through which there extends a Vycor (high silica, high temperature glass) horizontally-disposed evolution tube 12. The temperature at which the furnace 10 and the Vycor evolution tube 12 are maintained will vary somewhat with the solid specimen being investigated but typically for a steel specimen the carrier gas passing through the furnace is maintained at a temperature in the range of 700° C. to 850° C. The carrier gas is an inert gas such as nitrogen, helium, or argon which should contain substantially no oxygen or moisture. In the particular embodiment illustrated, the evolution tube 12 is provided with a wad of iron wool 11 within the confines of the furnace 10 which tends to react with traces of oxygen or moisture that may be unavoidably carried by the carrier gas.

In order to avoid distributing the operation of the system which would occur with the opening and closing of the furnace 10 to introduce sample specimens, the system is provided with an arrangement whereby successive samples 16 may be introduced to the evolution tube 12 without opening the furnace. This arrangement comprises a laterally extending Vycor tube 18 which is integral with an opening into the evolution tube 12 beyond the furnace 10. The auxiliary lateral Vycor tube 18 emerges from the evolution tube 12 at an angle of about 30 degrees. The auxiliary tube 18 houses several sample specimens 16 which are awaiting their turn for analysis. Following completion of an analysis, the next sample specimen 16 is moved by a magnet 20 from the auxiliary Vycor lateral tube 18 to the position 22 within the evolution tube 12. Once the specimen has been delivered to the evolution tube 12 by the magnet 20, the specimen is pushed along the evolution tube 12 by a magnet-driven Vycor tube 23, one end of which encases a piece of iron.

The evolution of hydrogen from the metallic sample 22 or other solid specimen is a result of the high diffusitivity of hydrogen atoms within the metal structure. Evolution can be accelerated by increasing the temperature of the specimen and by reducing the partial pressure of hydrogen around the specimen. Passing a constant stream of an inert gas through the tube 12 draws hydrogen molecules away from the sample specimen. A concentration gradient is thus created within the specimen causing the hydrogen to diffuse from the body of the metal to the surface where the hydrogen atoms form molecular hydrogen, which is carried away, to keep the hydrogen concentration at the surface near zero.

The hydrogen-containing carrier gas stream from the horizontally disposed evolution tube 12 enters the train through a short vertically disposed tube 24. In an alternative embodiment a tube 28 opens into the tube 24 in place of the evolution tube 12. The alternative tube 28 permits the introduction of a gas stream for quantitative hydrogen analysis. For this case, a chamber 26 is provided, filled with manganous oxide, a material which removes all oxygen at ambient temperature without, however, retaining any hydrogen.

Beyond the manganous oxide chamber 26 the gas stream passes a hydrogen electrolyzer 30 and then enters a drying chamber 32 which may be filled with magnesium perchlorate, or other suitable desiccant for removal of moisture, especially the moisture picked up from the electrolyzer. Whether the system is being used for the analysis of the hydrogen content of the gas stream introduced via tube 28 or whether it is applied to the hydrogen analysis of a solid specimen 22, located within the evolution tube 12, in neither case will hydrogen be added to the carrier gas as it passes the hydrogen electrolyzer 30. The hydrogen electrolyzer 30 is meant to be activated for checking purposes and will be described in greater detail subsequently.

From the drying chamber 32 the hydrogen containing gas stream, now substantially free of oxygen and moisture, enters a metal halide reactor 36 which in the preferred embodiment is filled with a palladium chloride powder distributed in a bed of one mm. diameter glass beads. The reactor is heated with an external ceramic wire wound resistor 38. In one typical reactor, the palladium chloride-glass bead column has a diameter of 0.4" and is 2" long. In preparation for an analysis the column is advisedly heated in an inert gas stream, for example nitrogen, which has been "doped" with hydrogen from the hydrogen electrolyzer 30, passing a current in the order of 1 ma. after this pretreatment has been carried on at a temperature of 250°–300° C. for say half an hour, the reactor is ready for use at a temperature of approximately 150° C. At this temperature the palladium chloride converts quantitatively the hydrogen contained in the carrier gas stream to hydrogen chloride. Halides other than chlorides; for example, bromides may be employed. Halides of metals other than palladium, for example nickel chloride, or cerous chloride, are also available for the conversion of $H_2$ to HCl.

Beyond the metal halide reactor 36, the gas stream passes to a galvanic cell or sensor 39 for acids which may have one of the several configurations of cells used for ozone or carbon monoxide analysis. However, it will be appreciated that the chemistry of the instant acid-sensing cell, the electrolyte employed, and possibly the combination of electrodes will differ from that characteristic of an ozone or carbon monoxide sensing cell. The particular cell 39 illustrated in the drawing is known as a horizontal cavity cell and includes an elongated, horizontally disposed, glass tube 40 (closed at one end) which has an upwardly directed exit line 42 for escape of the carrier gas and a downwardly directed lateral leg 44 which opens into an anode compartment 46 which in the particular embodiment illustrated employs a mercury anode. The anode is made up of a lower layer of mercury and an overlying layer of a mixture of mercury and mercurous chloride with the rest of the anode compartment being filled with electrolyte. Cathode 48 of the sensor cell illustrated in the drawing comprises a platinum screen tubular roll, closed at one end, which platinum screen cathode 48 has thereabout a porous, tubular, ceramic tube 50 closed at one end and whose lower, horizontally disposed side is immersed in a pool of electrolyte 52. The porous ceramic tube 50 absorbs electrolyte and distributes it about the tubular screen cathode 48 keeping the latter constantly wet.

The anode may be made of carbon paste, silver, or the illustrated mercury. A graphite cloth may be substituted for the platinum screen cathode in which instance filter paper would be wrapped externally about the graphite cloth to provide a wick action for distribution of the electrolyte to all areas of the cathode.

The gas stream from the metal halide reactor 36 enters the cavity cell galvanic acid sensor through an elongated glass jet member 54 which directs the gas stream past the electrolyte 52 bathing the cathode 48. The hydrogen ions from the acid react with the aqueous electrolyte in accordance with Equation 1 above to produce a halogen which is subsequently reduced at the cathode to a halide in accordance with Equation 2 and thus generates a current which is equivalent to the amount of entering acid. The preferred electrolyte is made up of potassium iodate, potassium iodide, and a third salt such as sodium bromide.

Between the metal halide reactor 36 and the galvanic acid sensor 39 there is located a zeroing loop which contains an absorbent made up of asbestos impregnated with soda-lime, known as Ascarite. The opposite ends of the zeroing loop are connected through valves 56 and 58 to the line connecting the metal halide reactor 36 and the galvanic acid sensor 39. In zeroing the system the valves 56 and 58 are positioned to direct the carrier gas stream through the zeroing loop wherein all the acid is absorbed by the Ascarite, thus permitting a zero reading of the galvanic acid sensor.

The hydrogen electrolyzer 30 provides a means for introducing at will into the carrier gas stream known amounts of hydrogen for checking purposes. The electrolyzer employed meets two important requirements; namely, that of fast attainment of a steady, noise and drift-free level of hydrogen and the absence of side reactions at a platinum cathode 31. The hydrogen electrolyzer 30 utilizes sulfuric acid as the electrolyte and employs mercury as the anode material. The electrolyzer 30 may be fed with, for example, a 90 volt battery connected in series with a variable resistor, allowing input currents up to 5 milliamperes. The rate of hydrogen generated is directly proportional to the input rate of the hydrogen electrolyzer 30. Theoretically the galvanic output of the galvanic acid sensor 39 is equal to the electrolytic input of the hydrogen electrolyzer 30.

A screw clamp 33 of the hydrogen electrolyzer 30 engages a short segment of a flexible tygon tubing 35. Adjustment of the screw clamp 33 provides a way for regulating the liquid level around a platinum cathode 31. Maintenance of the proper liquid level about the cathode 31 is important. To obtain a smooth evolution of hydrogen at the cathode it is necessary that only a small portion of the cathode be immersed in the electrolyte. Otherwise the hydrogen evolution becomes erratic. The proper level of electrolyte around the cathode 31 is adjusted by simple manipulation of the screw clamp 33.

Although exemplary embodiments of the invention have been disclosed for purposes of illustration, it will be understood that various minor changes, modifications and substitutions may be incorporated in such embodiments without departing from the spirit of the invention as defined by the claims which follow.

We claim:

1. An apparatus for detecting the amount of hydrogen in a gas stream, said apparatus comprising:
   means including a metal halide for quantitatively converting the hydrogen of the gas steam to an acid vapor;
   means for quantitatively and directly detecting the acid vapor of the gas stream; and
   conduit means for transferring the acid-containing gas stream from the hydrogen-converting means to said acid-detecting means.

2. An apparatus for detecting the amount of hydrogen in a gas stream, said apparatus comprising:
   means for quantitatively converting the hydrogen of the gas stream to an acid vapor, said converting means being a reactor containing a metal halide selected from the group consisting of palladium halide, nickel halide, and cerous halide;
   electrolytic means for quantitatively and directly detecting the acid vapor of the gas stream; and
   conduit means for transferring the acid-containing gas stream from the hydrogen-converting means to said acid-detecting means.

3. An apparatus for detecting the amount of hydrogen in a gas stream, said apparatus comprising:
   means for quantitatively converting the hydrogen of the gas stream to an acid vapor, said means including a reactor containing a metal halide selected from the group consisting of palladuim halide, nickel halide, and cerous halide;
   means for quantitatively detecting the acid vapor of the gas stream, said detecting means comprising a sensor cell having an electrolyte containing a halate and halide salt pair, said halate being selected from a group consisting of iodate and bromate, and said halide being selected from the group consisting of iodide and bromide, and means for measuring the current generated within said cell; and
   conduit means for transferring the acid-containing gas stream from the hydrogen-converting means to said acid-detecting means.

4. An apparatus for quantitatively detecting hydrogen in a metallic specimen, said apparatus comprising:
   heating means for heating the metallic specimen to an elevated temperature and evolving the gas contained therein into a carrier gas stream;
   means including a metal halide connected to said heating means for quantitatively converting hydrogen contained in the carrier gas stream to an acid vapor;
   means for quantitatively and directly detecting the acid vapor of the gas stream; and
   conduit means for transferring the acid vapor containing gas stream from said hydrogen-converting means to said acid-detecting means.

5. An apparatus for quantitatively detecting hydrogen in a metallic specimen, said apparatus comprising:
   heating means for heating the metallic specimen to an elevated temperature and evolving the gas contained therein into a carrier gas stream;
   means for quantitatively converting the hydrogen of said gas stream to an acid vapor, said converting means including a reactor containing a metal halide selected from the group consisting of palladium halide, nickel halide, and cerous halide;
   conduit means for delivering the gas stream from the heating means to said reactor converting means;
   electrolytic means for quantitatively detecting the acid of the gas stream; and
   conduit means for transferring the acid vapor containing gas stream from the hydrogen-converting means to said acid-detecting means.

6. An apparatus for quantitatively detecting hydrogen in a metallic specimen, said apparatus comprising:
   means for heating the metallic specimen to an elevated temperature and evolving the hydrogen contained therein into a carrier gas stream;
   means for quantitatively converting the hydrogen of said gas stream to an acid vapor, said converting means including a reactor containing a metal halide selected from the group consisting of palladium halide, nickel halide, and cerous halide;
   transfer means for delivering said gas stream from the heating means to said converting means;
   a sensor cell for quantitatively detecting the acid vapor of said gas stream, said cell having an electrolyte containing a halate and halide salt pair, said halate being selected from the group consisting of iodate and bromate and said halide being selected from the group consisting of iodide and bromide, and means for measuring the current generated within said cell; and
   conduit means for transferring the acid vapor containing gas stream from the hydrogen-converting means to said acid-detecting means.

7. An apparatus for detecting the amount of hydrogen in a gas stream, said apparatus comprising:
   means for removing oxygen and moisture from said gas stream;
   means including a metal halide for quantitatively converting the hydrogen of said gas stream to an acid vapor;
   conduit means for transferring said gas stream from said means for removing the oxygen and moisture to said means for quantitatively converting the hydrogen of said stream;
   means for quantitatively detecting the acid vapor of said gas stream; and
   conduit means for transferring said acid-containing gas stream from the hydrogen-converting means to said acid-detecting means.

8. An apparatus for detecting the amount of hydrogen in a gas stream, said apparatus comprising:
   means for removing oxygen and moisture from said gas stream;
   means for quantitatively converting the hydrogen of said gas stream to an acid vapor, said hydrogen converting means including a reactor containing metal halide selected from the group consisting of palladium halide, nickel halide, and cerous halide;
   conduit means for transferring said gas stream from the means for oxygen and moisture removal to said hydrogen converting means;
   means for quantitatively detecting the acid vapor of said gas stream; and
   conduit means for transferring said acid vapor containing gas stream from said hydrogen-converting means to said acid-detecting means.

9. An apparatus for detecting the amount of hydrogen in a gas stream, said apparatus comprising:
   means for removing oxygen and moisture from said gas stream;
   means for quantitatively converting the hydrogen of said gas stream to an acid vapor, said hydrogen converting means including a reactor containing metal halide selected from the group consisting of a palladium halide, nickel halide, and cerous halide;

conduit means for transferring said gas stream from the means for removing the oxygen and moisture to said hydrogen converting means;

means for quantitatively detecting the acid vapor of said gas stream, said acid detecting means including a cell having an electrolyte containing a halate and halide salt pair, said halate being selected from the group consisting of iodate and bromate and said halide being selected from the group consisting of iodide and bromide, an anode and a space cathode located in said electrolyte, and means for measuring the current generated within the cell; and conduit means for transferring said acid vapor containing gas stream from said hydrogen-converting means to said acid-detecting means.

10. A method of detecting the amount of hydrogen in a gas stream, said method comprising:

conveying the hydrogen-containing gas stream substantially free of moisture and oxygen to a metallic halide selected from the group consisting of palladium halide, nickel halide, and cerous halide;

quantitatively reacting the hydrogen of the gas stream with the metal halide at an elevated reactive temperature to produce a hydrogen halide vapor; and thereafter introducing the hydrogen halide vapor containing gas stream to a sensing device and there determining the concentration of said acid and its hydrogen precursor.

11. A method of detecting the amount of hydrogen in a gas stream, said method comprising:

conveying the hydrogen-containing gas stream substantially free of moisture and oxygen to a metal halide selected from the group consisting of palladium halide, nickel halide, and cerous halide;

quantitatively reacting the hydrogen of the gas stream with the metallic halide at an elevated reactive temperature to produce hydrogen halide;

providing a cell having an electrolyte containing a halate and halide salt pair, said halate being selected from the group consisting of iodate and bromate and said halide being selected from the group consisting of iodide and bromide with a spaced anode and a cathode located in said electrolyte;

introducing the hydrogen halide containing gas stream into the cell and bringing said hydrogen halide into contact with the electrolyte to generate a halogen;

reducing the halogen to halide at the cathode; and measuring the current generated by the reduction of the halogen.

12. A method of detecting the amount of hydrogen in a gas stream, said method comprising:

conveying the hydrogen-containing gas stream substantially free of moisture and oxygen to a metal halide selected from the group consisting of palladium halide, nickel halide, and cerous halide;

quantitatively reacting the hydrogen of the gas stream with the metal halide at an elevated reactive temperature to produce hydrogen halide;

providing a cell having an electrolyte containing a halate and halide salt pair, said halate being selected from the group consisting of iodate and bromate and said halide being selected from the group consisting of iodide and bromide and containing a third salt with an anode and a spaced cathode located in said electrolyte;

introducing the hydrogen halide containing gas stream into the cell and bringing said hydrogen halide into contact with the electrolyte to generate a halogen;

reducing the halogen to halide at the cathode; and measuring the current generated by the reduction of the halogen.

13. A method of quantitatively detecting hydrogen in a metallic specimen, said method comprising:

heating the metallic specimen to an elevated temperature and evolving hydrogen gas from the metallic specimen into a carrier gas stream;

conveying the hydrogen-containing gas stream substantially free of moisture ad oxygen to a metal halide selected from the group consisting of palladium halide, nickel halide, and cerous halide;

quantitatively reacting the hydrogen of the gas stream with the metal halide at an elevated reactive temperature to produce a hydrogen halide; and thereafter introducing the hydrogen halide containing gas stream to a sensing device and there determining the concentration of the hydrogen halide and its hydrogen precursor.

14. A method of quantitatively detecting hydrogen in a metallic specimen, said method comprising:

heating the metallic specimen to an elevated temperature and evolving the hydrogen gas contained therein into an inert carrier gas stream;

conveying the hydrogen-containing gas stream substantially free of moisture and oxygen to a metal halide selected from the group consisting of palladium halide, nickel halide, and cerous halide;

quantitatively reacting the hydrogen of the gas stream with the metal halide at an elevated reactive temperature to produce a hydrogen halide;

providing a cell having an electrolyte containing a halate and halide salt pair, said halate being selected from the group consisting of iodate and bromate and said halide being selected from the group consisting of iodide and bromide with an anode and a spaced cathode located in said electrolyte;

introducing the hydrogen halide containing gas stream into the cell and bringing said hydrogen halide into contact with the electrolyte to generate a halogen;

reducing the halogen to halide at the cathode; and measuring the current generated by the reduction of the halogen.

15. The method of quantitatively detecting hydrogen in a metallic specimen, said method comprising:

heating the metallic specimen to an elevated temperature and evolving the gas contained therein into a carrier gas stream;

conveying the hydrogen-containing gas stream substantially free of moisture and oxygen to a metal halide selected from the group consisting of palladium halide, nickel halide, and cerous halide;

quantitatively reacting the hydrogen of the gas stream with the metal halide at an elevated reactive temperature to produce a hydrogen halide;

providing a cell having an electrolyte containing a halate and halide salt pair, said halate being selected from the group consisting of iodate and bromate and said halide being selected from the group consisting of iodide and a bromide and containing a third salt with an anode and a spaced cathode located in said electrolyte;

introducing the hydrogen halide containing gas stream into the cell and bringing said hydrogen halide into contact with the electrolyte to generate a halogen;

reducing the halagen to halide at the cathode; and measuring the current generated by the reduction of the halogen.

16. A method of quantitatively detecting hydrogen in a metallic specimen, said method comprising:

heating the metallic specimen to an elevated temperature and evolving the hydrogen gas contained therein into a carrier gas stream;

conveying the hydrogen-containing gas stream substantially free of moisture and oxygen to a metal halide selected from the group consisting of palladium halide, nickel halide, and cerous halide;

quantitatively reacting the hydrogen of the gas stream with the metal halide at an elevated reactive temperature to produce a hydrogen halide;

providing a cell having an electrolyte containing a halate and halide salt pair, said halate being selected from the group consisting of iodate and bromate and said halide being selected from the group consisting of iodide and bromide and containing a third salt with an anode and a spaced cathode located in said electrolyte, said anode being made of an electrode material selected from the group consisting of activated carbon, silver, and mercury and said cathode being made of an electrode material selected from the group consisting of platinum and carbon;

introducing the hydrogen halide-containing gas stream into the cell and bringing said hydrogen halide into contact with the electrolyte to generate halogen;

reducing the halogen to halide at the cathode; and measuring the current generated by the reduction of the halogen.

17. The method of quantitatively detecting hydrogen in a solid sample, said method comprising:

heating the solid sample to evolve the hydrogen gas contained therein without destruction of the sample into a carrier gas stream;

conveying the hydrogen-containing gas stream substantially free of moisture and oxygen to a metal halide selected from the group consisting of palladium halide, nickel halide, and cerous halide;

quantitatively reacting the hydrogen of the gas stream with the metal halide at an elevated reactive temperature to produce a hydrogen halide; and thereafter introducing the hydrogen halide containing gas stream to a sensing device and there determining the concentration of said hydrogen halide and its hydrogen precursor.

References Cited

UNITED STATES PATENTS

| | | | |
|---|---|---|---|
| 3,001,917 | 9/1961 | Scheirer | 204—195 |
| 3,028,317 | 4/1962 | Wilson et al. | 204—195 |
| 3,119,669 | 1/1964 | Laird et al. | 23—232 |
| 3,304,170 | 2/1967 | Hinsvark | 23—232 |

HOWARD S. WILLIAMS, *Primary Examiner.*

T. TUNG, *Assistant Examiner.*